(12) United States Patent
Taira et al.

(10) Patent No.: US 9,580,590 B2
(45) Date of Patent: Feb. 28, 2017

(54) METHOD FOR PRODUCING AQUEOUS POLYTETRAFLUOROETHYLENE DISPERSION

(75) Inventors: Takahiro Taira, Settsu (JP); Taku Yamanaka, Settsu (JP); Yoshinori Nanba, Settsu (JP); Atsuko Tanaka, Settsu (JP); Makoto Ono, Settsu (JP); Nobuhiko Tsuda, Settsu (JP); Taketo Kato, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/239,910

(22) PCT Filed: Aug. 27, 2012

(86) PCT No.: PCT/JP2012/071619
§ 371 (c)(1),
(2), (4) Date: Feb. 20, 2014

(87) PCT Pub. No.: WO2013/027850
PCT Pub. Date: Feb. 28, 2013

(65) Prior Publication Data
US 2014/0200310 A1    Jul. 17, 2014

(30) Foreign Application Priority Data
Aug. 25, 2011   (JP) ................................ 2011-184099

(51) Int. Cl.
| | |
|---|---|
| C08F 14/26 | (2006.01) |
| C08F 214/26 | (2006.01) |
| C08L 27/18 | (2006.01) |
| C08F 114/26 | (2006.01) |
| C08F 2/24 | (2006.01) |
| C08F 2/22 | (2006.01) |
| C08F 2/30 | (2006.01) |
| C08F 2/26 | (2006.01) |

(52) U.S. Cl.
CPC .................. *C08L 27/18* (2013.01); *C08F 2/24* (2013.01); *C08F 114/26* (2013.01); *C08F 214/26* (2013.01); *C08F 214/262* (2013.01); *C08F 2/22* (2013.01); *C08F 2/26* (2013.01); *C08F 2/30* (2013.01)

(58) Field of Classification Search
CPC .................. C08F 2/22; C08F 2/26; C08F 2/30; C08F 14/18; C08F 14/26; C08F 214/18; C08F 214/26
USPC ......................................... 524/544, 462, 457
See application file for complete search history.

(56) References Cited

U.S. PATENT DOCUMENTS

| | | | | |
|---|---|---|---|---|
| 6,429,258 B1* | 8/2002 | Morgan et al. | ................ | 524/805 |
| 7,041,728 B2* | 5/2006 | Zipplies | .................... | C08F 6/16 524/544 |
| 7,414,483 B2* | 8/2008 | Shimamoto | ........ | G01R 31/3016 327/261 |
| 7,514,483 B2* | 4/2009 | Hoshikawa et al. | .......... | 523/310 |
| 8,299,155 B2* | 10/2012 | Sawauchi | .................. | C08J 3/05 524/247 |
| 8,735,492 B2* | 5/2014 | Imoto | ....................... | C08F 2/22 524/544 |
| 8,952,115 B2* | 2/2015 | Imoto | ..................... | C08F 14/18 526/214 |
| 2002/0161149 A1* | 10/2002 | Kobayashi | ............ | C08F 214/26 526/250 |
| 2005/0090601 A1* | 4/2005 | Dadalas | ................ | C09D 127/18 524/544 |
| 2007/0015857 A1 | 1/2007 | Hoshikawa et al. | | |
| 2007/0135558 A1 | 6/2007 | Tsuda et al. | | |
| 2008/0269408 A1 | 10/2008 | Brothers et al. | | |
| 2009/0036604 A1* | 2/2009 | Kishine | ................ | C08F 214/22 524/773 |
| 2009/0176952 A1* | 7/2009 | Funaki | .................. | C08F 214/26 526/206 |
| 2009/0234086 A1* | 9/2009 | Kishine et al. | ................ | 526/245 |
| 2010/0029878 A1* | 2/2010 | Matsuoka et al. | ............ | 526/209 |
| 2010/0204345 A1* | 8/2010 | Yamanaka et al. | ........ | 514/772.4 |
| 2012/0157646 A1 | 6/2012 | Imoto et al. | | |
| 2012/0202906 A1 | 8/2012 | Higuchi et al. | | |

FOREIGN PATENT DOCUMENTS

| | | |
|---|---|---|
| EP | 2267047 A1 | 12/2010 |
| EP | 2287209 A1 | 2/2011 |
| JP | 2007-023088 A | 2/2007 |
| JP | 2009-155558 A | 7/2009 |
| JP | 2010-509441 A | 3/2010 |
| JP | 2010-180364 A | 8/2010 |
| JP | 2010-235667 A | 10/2010 |

(Continued)

OTHER PUBLICATIONS

International Search Report dated Nov. 20, 2012 for PCT Appln. No. PCT/JP2012/071619.
International Preliminary Report on Patentability with Written Opinion of the International Searching Authority dated Feb. 25, 2014 for PCT Appln. No. PCT/JP2012/071619.
Communication dated Mar. 18, 2015, issued by the European Patent Office in counterpart Application No. 12825282.2.
Communication dated Feb. 17, 2016, from the European Patent Office in counterpart European Application No. 15195163.9.
Communication dated Feb. 17, 2016, from the European Patent Office in counterpart European Application No. 15195164.7.
Communication dated Feb. 17, 2016, from the European Patent Office in counterpart European Application No. 15195165.4.

*Primary Examiner* — Rip A Lee
(74) *Attorney, Agent, or Firm* — Sughrue Mion, PLLC

(57) ABSTRACT

The present invention aims to provide a novel method for producing an aqueous dispersion containing non-melt-processable polytetrafluoroethylene particles. The present invention relates to a method for producing an aqueous dispersion containing non-melt-processable polytetrafluoroethylene particles, the method including polymerizing tetrafluoroethylene in an aqueous medium in the presence of perfluoro hexanoic acid or its salt.

7 Claims, No Drawings

(56) References Cited

FOREIGN PATENT DOCUMENTS

| WO | 2005/042593 A1 | 5/2005 | |
|---|---|---|---|
| WO | 2008/001894 A1 | 1/2008 | |
| WO | 2008/001895 A1 | 1/2008 | |
| WO | 2008/132959 A1 | 11/2008 | |
| WO | 2009/020187 A1 | 2/2009 | |
| WO | WO 2009/020187 A1 * | 2/2009 | ............ C08F 14/26 |
| WO | 2011/024856 A1 | 3/2011 | |
| WO | 2011/055824 A1 | 5/2011 | |

* cited by examiner

METHOD FOR PRODUCING AQUEOUS POLYTETRAFLUOROETHYLENE DISPERSION

CROSS REFERENCE TO RELATED APPLICATIONS

This application is a National Stage of International Application No. PCT/JP2012/071619, filed Aug. 27, 2012, claiming priority from Japanese Patent Application No. 2011-184099, filed Aug. 25, 2011, the contents of all of which are incorporated herein by reference in their entirety.

TECHNICAL FIELD

The present invention relates to a method for producing an aqueous dispersion containing non-melt-processable polytetrafluoroethylene particles.

BACKGROUND ART

According to Patent Literature 1, melt-processable polytetrafluoroethylene is produced in the presence of ammonium perfluorohexanoate. However, since a large amount of ammonium persulfate is used in the presence of ethane, polymeric non-melt-processable PTFE cannot be produced under this condition.

Patent Literature 2 discloses an aqueous dispersion of polytetrafluoroethylene produced by polymerization in the presence of ammonium perfluorooctanoate and ammonium perfluoroheptanoate.

Patent Literature 3 discloses a method for polymerizing fluorine-containing monomers in an aqueous medium containing an initiator and a polymerization aid, wherein the polymerization aid includes a combination of a fluoropolyether acid having a number average molecular weight of 800 g/mol or more and a fluorochemical surfactant.

Patent Literature 4 discloses a method for producing a polytetrafluoroethylene aqueous emulsion containing 0.001 to 0.01% by mass, based on the amount of produced polytetrafluoroethylene, of a comonomer having a monomer reactivity ratio of 0.1 to 8 in copolymerization with tetrafluoroethylene, in the presence of a C4-C8 fluorine-containing carboxylic acid having 1 to 4 ether oxygen atoms in a main chain and its salt.

CITATION LIST

Patent Literature

Patent Literature 1: JP-A 2010-180364
Patent Literature 2: WO 2005/42593
Patent Literature 3: US Patent Application Publication 2008/0269408
Patent Literature 4: WO 2011/055824

SUMMARY OF INVENTION

Technical Problem

A fluorine-containing emulsifier having an ether bond as disclosed in Patent Literature 4 problematically has poor stability in a liquid. In addition, such a fluorine-containing emulsifier having an ether bond is decomposed during polymerization of tetrafluoroethylene at high temperatures or for a long time, and therefore is problematically less able to stably disperse non-melt-processable PTFE particles produced in the polymerization.

To solve the problem, use of emulsifiers having no ether bond such as ammonium perfluorooctanoate can be considered. However, such emulsifiers are environmentally persistent and are slow in excretion from living bodies, raising a demand for alternative compounds.

The present invention aims to provide, in consideration of the state of the art, a novel method for producing an aqueous dispersion containing non-melt-processable polytetrafluoroethylene particles.

Solution to Problem

The present invention relates to a method for producing an aqueous dispersion containing non-melt-processable polytetrafluoroethylene particles, the method including polymerizing tetrafluoroethylene in an aqueous medium in the presence of perfluoro hexanoic acid or its salt.

Preferably, in the method of the present invention, tetrafluoroethylene is polymerized further in the presence of fluoropolyether acid having a molecular weight of at least 800 g/mol or its salt (1).

Preferably, fluoropolyether acid or its salt (1) has at least one repeated structure selected from the group consisting of repeated structures represented by the formulae (1a) to (1d):

 (1a);

 (1b);

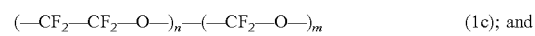 (1c); and

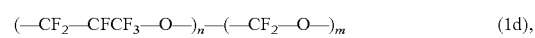 (1d), wherein m and n each represent an integer of 1 or more.

Preferably, in the method of the present invention, tetrafluoroethylene is polymerized further in the presence of a nonionic surfactant (2).

Preferably, in the method of the present invention, tetrafluoroethylene is polymerized further in the presence of a comonomer (3) having a monomer reactivity ratio of 0.1 to 8.

Preferably, the comonomer (3) is at least one selected from the group consisting of comonomers represented by the formulae (3a) to (3d):

 (3a), wherein $Rf^1$ represents a C1-C10 perfluoroalkyl group;

 (3b), wherein $Rf^2$ represents a C1-C2 perfluoroalkyl group;

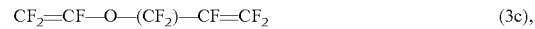 (3c), wherein n represents 1 or 2;

 (3d)

wherein $X^3$ and $X^4$ each represent F, Cl, or a methoxy group, and Y is represented by the formula Y1 or Y2;

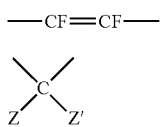
(Y1)
(Y2)

wherein Z and Z' each represent F or a C1-C3 fluorinated alkyl group.

Preferably, in the method of the present invention, tetrafluoroethylene is polymerized further in the presence of a reactive emulsifier (4).

The reactive emulsifier (4) is preferably at least one selected from the group consisting of compounds represented by the formulae (4a) to (4e):

$$CF_2=CF-(CF_2)_{n1}-Y^3 \quad (4a)$$

wherein n1 represents an integer of 1 to 10, $Y^3$ represents $-SO_3M^1$ or $-COOM^1$, $M^1$ represents H, $NH_4$ or an alkali metal;

$$CF_2=CF-(CF_2C(CF_3))_{n2}-Y^3 \quad (4b),$$

wherein n2 represents an integer of 1 to 5, and $Y^3$ is as defined above;

$$CF_2=CF-O-(CFX^1)_{n3}-Y^3 \quad (4c),$$

wherein $X^1$ represents F or $CF_3$, n3 represents an integer of 1 to 10, and $Y^3$ is as defined above;

$$CF_2=CF-O-(CF_2CFX^1O)_{n4}-CF_2CF_2-Y^3 \quad (4d)$$

wherein n4 represents an integer of 1 to 10, and $Y^3$ and $X^1$ are as defined above;

$$CX^2{}_2=CFCF_2-O-(CF(CF_3)CF_2O)_{n5}-CF(CF_3)-Y^3 \quad (4e)$$

wherein $X^2$s are the same as one another and represent F or H, n5 represents an integer of 0 or 1 to 10, and $Y^3$ is as defined above.

Advantageous Effects of Invention

The method of the present invention can produce an aqueous dispersion of non-melt-processable polytetrafluoroethylene excellent in dispersion stability, without using ammonium perfluorooctanoate that is environmentally persistent and slow in excretion from living bodies.

DESCRIPTION OF EMBODIMENT

The present invention is specifically described in the following.

The present invention relates to a method for producing an aqueous dispersion containing non-melt-processable polytetrafluoroethylene [PTFE] particles.

The PTFE may be homopolymers of tetrafluoroethylene [TFE] or modified polytetrafluoroethylene [modified PTFE] as long as it is non-melt-processable. The term "non-melt-processable" herein refers to a property that the melt flow rate cannot be measured at a temperature higher than the crystalline melting point, in conformity with ASTM D-1238 and D-2116. The PTFE is preferably able to be fibrillated.

The modified PTFE is copolymers of TFE and a trace of monomers copolymerizable with TFE and is not melt-processable. The trace of monomers is not particularly limited as long as it is copolymerizable with TFE, and examples thereof include: perfluoroolefins such as hexafluoropropylene [HFP]; chlorofluoroolefins such as chlorotrifluoroethylene [CTFE]; hydrogen-containing fluoroolefins such as trifluoroethylene and vinylidene fluoride [VDF]; fluorinated (alkyl vinyl ethers); perfluoroalkyl ethylene; cyclic fluorinated monomers; and ethylene. One kind of modified monomers may be used, or two or more kinds of modified monomers may be used in combination.

Examples of the fluorinated (alkyl vinyl ethers) include perfluoro(alkyl vinyl ether) [PAVE]. The PAVE is not particularly limited, and examples thereof include perfluoro unsaturated compounds represented by the formula (5):

$$CF_2=CF-ORf \quad (5),$$

wherein Rf represents a perfluoro organic group. The term "perfluoro organic group" herein refers to an organic group in which hydrogen atoms bonded to carbon atoms are all substituted with fluorine atoms. The perfluoro organic group may contain ether oxygen.

Examples of the perfluoro vinyl ether include perfluoro (alkyl vinyl ether) [PAVE] represented by the formula (5) in which Rf represents a C1-C10 perfluoroalkyl group. The perfluoroalkyl group preferably has a carbon number of 1 to 5.

Examples of the perfluoroalkyl group in the PAVE include perfluoro methyl, perfluoro ethyl, perfluoro propyl, perfluoro butyl, perfluoro pentyl, and perfluoro hexyl groups. Preferably, perfluoro propyl vinyl ether [PPVE] in which the perfluoroalkyl group is a perfluoro propyl group is used.

Examples of the perfluoro vinyl ether further include the compounds represented by the formula (5) in which Rf is a C4-C9 perfluoro(alkoxyalkyl) group, in which Rf is a group represented by the following formula:

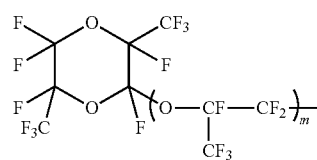

wherein m represents an integer of 0 or 1 to 4, and in which Rf is a group represented by the following formula:

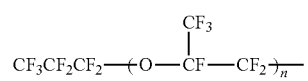

wherein n represents an integer of 1 to 4.

The perfluoro alkyl ethylene [PFAE] is not limited, and examples thereof include perfluorobutylethylene [PFBE] and perfluorohexylethylene.

The modified monomer in the modified PTFE is preferably at least one selected from the group consisting of HFP, CTFE, VDF, PAVE, PFAE, and ethylene.

A trace monomer unit derived from the trace of monomers constitutes preferably 0.001 to 2% by mass, and more preferably 0.01 to 1% by mass of the whole polymer chain of the modified PTFE.

The term "monomer unit" such as the trace monomer unit herein refers to a part of the molecular structure of the modified PTFE, and the part derived from the corresponding monomer. The trace monomer unit derived from the trace of monomers is obtained by measuring the infrared absorption spectrum of fine powder prepared from a PTFE aqueous dispersion by coagulation, washing, and drying.

Accordingly, the method of the present invention may include polymerizing, in addition to TFE, fluoroolefin, fluorinated (alkyl vinyl ether), cyclic fluorinated monomers, perfluoroalkylethylene, and the like.

The method of the present invention includes polymerizing tetrafluoroethylene in an aqueous medium in the presence of perfluorohexanoic acid or its salt.

Examples of the perfluorohexanoates include an ammonium salt, sodium salt, and potassium salt of perfluoro hexanoic acid. Among the perfluoro hexanoic acid and the perfluoro hexanoic acid salts, ammonium salt of perfluoro hexanoic acid is preferable because of its fine dispersibility.

The amount of the perfluoro hexanoic acid or its salt is preferably 10 to 0.001% by mass and more preferably 5 to 0.01% by mass based on the amount of the aqueous medium. If the amount of the perfluoro hexanoic acid or its salt is too large, the resin colloid obtained due to the electrolyte effect has poor stability, possibly failing to increase the yield. Further, the system may be unstable to increase the agglomerates or deposits in the reaction vessel during or after the reaction. If the amount is too small, the stabilizing effect by the surfactant may be insufficient, making the system unstable.

The aqueous medium in the present invention is not limited as long as it contains water. The aqueous medium may contain, in addition to water, a water-soluble organic solvent as far as it does not impair the present invention. Water is preferably used as the aqueous medium.

Polymerization in the present invention may be performed by a conventionally known method, provided that it is performed in the presence of perfluoro hexanoic acid or its salt. In the case that the perfluoro hexanoic acid or its salt is preliminary added to the aqueous medium before polymerization, they may not be added during the polymerization reaction.

Tetrafluoroethylene can be polymerized optionally with a trace of monomers in an aqueous medium containing the perfluoro carboxylic acid or its salt, a polymerization initiator, and additives thereof.

The polymerization initiator is not limited as long as it generates radicals in the polymerization, and examples thereof include oxidants such as persulfates (e.g., ammonium persulfate, potassium persulfate), water-soluble organic peroxides (e.g., disuccinic acid peroxide, bisglutaric acid peroxide, tert-butyl hydroperoxide), and potassium permanganate. The polymerization initiator may be a redox initiator prepared by combining the oxidant and a reducing agent such as sulfite salt, bisulfite salt, oxalic acid, and ferrous chloride.

The additives are not particularly limited as long as they have been conventionally used in polymerization, and examples thereof include radical scavengers and stabilizers.

Examples of the radical scavengers include aromatic hydroxy compounds, aromatic amines, and quinone compounds, and hydroquinone is preferable. The radical scavengers are preferably added during the polymerization reaction.

Examples of the stabilizers include paraffin waxes. Examples of the paraffin waxes include a saturated hydrocarbon having at least 16 carbon atoms and a melting point of 50 to 70° C.

In the polymerization, the amounts of monomers such as the TFE, the polymerization initiator, and additives are not particularly limited and may be appropriately determined in accordance with the kinds of the polymerization initiator and additives to be used and the polymerization scale.

In the polymerization, reaction conditions such as the polymerization temperature and polymerization pressure may be appropriately determined in accordance with the kinds of the polymerization initiator and additives and the polymerization scale.

The polymerization temperature is commonly 30 to 120° C., and is preferably 50 to 100° C.

The polymerization pressure is commonly 0.1 to 5 MPa, and is preferably 0.5 to 3 MPa.

During the polymerization, an operation for accelerating the radical decomposition is preferably performed. The radical decomposition is accelerated during the polymerization so that the radicals are consumed to lower the radical concentration in the later stage of the polymerization, thereby preparing high-molecular-weight PTFE particles.

Examples of such operations include: (1) addition of a reducing agent to the reaction system; and (2) increasing polymerization temperature by at least 5° C. from the temperature at the start of the polymerization. Examples of the reducing agent used in the operation (1) include sodium disulfite.

In the method of the present invention, TFE is preferably polymerized in the presence of fluoropolyether acid having a molecular weight of at least 800 g/mol or its salt (1), in addition to perfluoro hexanoic acid or its salt. The presence of fluoropolyether acid or its salt (1) allows production of PTFE particles with a small particle size, leading to preparation of an aqueous dispersion with high dispersion stability.

The fluoropolyether acid or its salt (1) is preferably carboxylic acid, sulfonic acid, sulfonamide, or phosphonic acid, and is more preferably carboxylic acid. Among the fluoropolyether acid and its salt (1), preferred is a salt of fluoropolyether acid, more preferred is an ammonium salt of fluoropolyether acid, and still more preferred is an ammonium salt of fluoropolyether carboxylic acid.

The fluoropolyether acid or its salt (1) can have any of chain structures in which oxygen atoms in a main chain of a molecule are separated by C1-C3 saturated fluorocarbon groups. Two or more kinds of fluorocarbon groups can be present in a molecule.

The fluoropolyether acid or its salt (1) preferably has a repeating unit represented by the formulae (1a) to (1d):

$$(-CFCF_3-CF_2-O-)_n \quad (1a);$$

$$-CF_2-CF_2-CF_2-O-)_n \quad (1b);$$

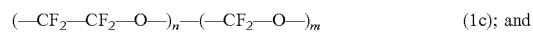
$$(-CF_2-CF_2-O-)_n-(-CF_2-O-)_m \quad (1c); \text{ and}$$

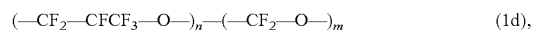
$$(-CF_2-CFCF_3-O-)_n-(-CF_2-O-)_m \quad (1d),$$

wherein m and n each represent an integer of 1 or more.

These structures have been studied by Kasai in J. Appl. Polymer Sci., 57, 797 (1995). As disclosed in the literature, such fluoropolyethers can have a carboxylic acid group or its salt at one terminal or both terminals. Similarly, such fluoropolyethers may have a sulfonic acid or phosphonic acid group, or its salt at one terminal or both terminals. In addition, a fluoropolyether having acid functional groups at both terminals may have a different group at each terminal. In a molecule of a monofunctional fluoropolyether, the terminal without a functional group is commonly perfluorinated, and may have a hydrogen or chlorine atom.

A fluoropolyether having acid groups at one terminal or both terminals has at least two ether oxygens, preferably at least four ether oxygens, and still more preferably at least six ether oxygens. Preferably at least one, more preferably at least two of fluorocarbon groups separating the ether oxygens have two or three carbon atoms. More preferably, at least 50% of the fluorocarbon groups separating the ether oxygens have two or three carbon atoms. In addition, it is preferable that the fluoropolyether has at least 15 carbon atoms in total and that the preferable minimum value for n or n+m in the repeating unit is at least 5. Two or more kinds of fluoropolyethers having acid groups at one terminal or both terminals can be used in the method of the present invention. Unless specially treated in production of a single specific fluoropolyether compound, the fluoropolyether may contain plural compounds at various ratios within a molecular weight range corresponding to the average molecular weight.

The fluoropolyether acid or its salt (1) has a number average molecular weight of 800 g/mol or more. The fluoropolyether acid or its salt (1) preferably has a number average molecular weight of less than 6000 g/mol. If the number average molecular weight is 6000 g/mol or more, the fluoropolyether acid or its salt (1) may be hardly dispersed in an aqueous polymerization medium. The fluoropolyether acid or its salt (1) has a number average molecular weight of more preferably 800 to 3500 g/mol, and still more preferably 1000 to 2500 g/mol.

The amount of the fluoropolyether acid or its salt (1) is preferably 5 to 3000 ppm, more preferably 5 to 2000 ppm based on the amount of the aqueous medium. A still more preferable lower limit of the amount is 10 ppm and a still more preferable upper limit thereof is 100 ppm.

In the method of the present invention, TFE is preferably polymerized in the presence of, in addition to the perfluoro hexanoic acid or its salt, a nonionic surfactant (2). The presence of the nonionic surfactant (2) allows production of PTFE particles with a small particle size, leading to preparation of an aqueous dispersion with high dispersion stability.

The nonionic surfactant (2) is preferably a fluorine-free nonionic surfactant. Examples thereof include: ether nonionic surfactants such as polyoxyethylene alkyl phenyl ether, polyoxyethylene alkyl ether, and polyoxyethylene alkylene alkyl ether; polyoxyethylene derivatives such as ethylene oxide/propylene oxide block copolymers; ester nonionic surfactants such as sorbitan fatty acid ester, polyoxyethylene sorbitan fatty acid ester, polyoxyethylene sorbitol fatty acid ester, glycerin fatty acid ester, and polyoxyethylene fatty acid ester; and amine nonionic surfactants such as polyoxyethylene alkyl amine and alkyl alkanolamide.

In the nonionic surfactant (2), the hydrophobic group may be any of alkylphenol, straight alkyl, and branched alkyl groups.

Examples of the nonionic surfactant (2) include compounds represented by the formula (i):

$$R^3-O-A^1-H \qquad (i),$$

wherein $R^3$ is a C8-C18 straight or branched primary or secondary alkyl group, and $A^1$ is a polyoxyalkylene chain. The polyoxyalkylene chain may include oxyethylene and oxypropylene.

Exemplary commercial products of the polyoxyethylene alkyl ether include Genapol X080 (product name, Clariant), TERGITOL 9-S-15 (product name, Clariant), NOIGEN TDS-80 (product name, DAI-ICHI KOGYO SEIYAKU CO., LTD.), LEOCOL TD90 (product name, Lion Corporation), and Puronon 104 (product name, NOF CORPORATION).

Examples of the nonionic surfactant (2) also include compounds represented by the formula (ii):

$$R^4-C_6H_4-O-A^2-H \qquad (ii),$$

wherein $R^4$ is a C4-C12 straight or branched primary or secondary alkyl group, and $A^2$ is a polyoxyalkylene chain.

Examples of the polyoxyethylene alkyl phenyl ether nonion compound include TRITON X-100 (product name, The Dow Chemical Company).

The amount of the nonionic surfactant (2) is preferably 0.1 to 0.0000001% by mass, and more preferably 0.01 to 0.000001% by mass based on the amount of the aqueous medium. If the amount of the nonionic surfactant (2) is too large, the polymerization rate is lowered or the reaction is stopped by chain transfer, and therefore, such an amount is not practical. If the amount of the nonionic surfactant (2) is too small, production of PTFE particles with a small particle size may be difficult. In addition, it may be difficult to obtain a PTFE aqueous dispersion with high dispersion stability.

In the method of the present invention, tetrafluoroethylene is preferably polymerized in the presence of, in addition to the perfluoro hexanoic acid or its salt, a comonomer (3) having a monomer reactivity ratio of 0.1 to 8 at the start of polymerization of TFE. The presence of the comonomer (3) allows production of PTFE particles having a small particle size, leading to preparation of an aqueous dispersion with high dispersion stability.

Here, the monomer reactivity ratio in copolymerization with TFE is obtained by dividing the rate constant in the case that propagating radicals react with TFE by the rate constant in the case that the propagating radicals react with comonomers, in the case that the propagating radicals are less than the repeating unit derived from TFE. A smaller monomer reactivity ratio indicates higher reactivity of the comonomers with TFE. The monomer reactivity ratio is calculated by determining the composition of the polymer produced right after the start of copolymerization of TFE and comonomers and using the Fineman-Ross equation.

The comonomers (3) having a monomer reactivity ratio of 0.1 to 8 is preferably at least one selected from the group consisting of comonomers represented by the formulae (3a) to (3d):

$$CH_2=CH-Rf^1 \qquad (3a),$$

wherein $Rf^1$ is a C1-C10 perfluoroalkyl group;

$$CF_2=CF-O-Rf^2 \qquad (3b),$$

wherein $Rf^2$ is a C1-C2 perfluoroalkyl group;

$$CF_2=CF-O-(CF_2)_nCF=CF_2 \qquad (3c),$$

wherein n is 1 or 2; and

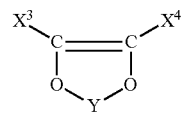
(3d)

wherein $X^3$ and $X^4$ each represent F, Cl, or a methoxy group, and Y is represented by the formula Y1 or Y2:

$$-CF=CF- \qquad (Y1)$$

(Y2)

wherein Z and Z' each represent F or a C1-C3 fluorinated alkyl group.

The amount of the comonomers (3) is preferably 0.001 to 0.01% by mass, and more preferably 0.002 to 0.01% by mass based on the net amount of the produced PTFE. If the amount of the comonomers (3) is too large, the polymerization rate is lowered or the reaction is stopped by chain transfer, and therefore, such an amount is not practical. If the amount of the comonomers (3) is too small, production of PTFE particles with a small particle size may be difficult. In addition, it may be difficult to obtain a PTFE aqueous dispersion with high dispersion stability.

In the method of the present invention, TFE is preferably polymerized in the presence of, in addition to the perfluoro hexanoic acid or its salt, a reactive emulsifier (4). The presence of the reactive emulsifier (4) allows production of PTFE particles having a small particle size, leading to preparation of an aqueous dispersion with high dispersion stability.

The amount of the reactive emulsifier (4) is preferably larger than the amount corresponding to 0.1 ppm of the aqueous medium, more preferably the amount corresponding to 5 ppm or more, and still more preferably 10 ppm or more. If the amount of the reactive emulsifier (4) is too small, the resulting PTFE particles may have a large particle size. The amount of the reactive emulsifier (4) may fall within the above range, and the upper limit thereof may be set to, for example, 5000 ppm. In the method, the reactive emulsifier (4) may be added to the system during the reaction for the purpose of improving the stability of the aqueous dispersion during or after the reaction.

Since the reactive emulsifier (4) is highly water-soluble, even when being left in the aqueous dispersion, the unreacted reactive emulsifier (4) is easily removed in the concentration process or in the coagulation/washing process similarly to a fluorinated compound described later.

The reactive emulsifier (4) is incorporated into the produced polymer during the polymerization. Since the concentration of the reactive emulsifier (4) in the polymerization system is low and the amount incorporated into the polymer is small, problems such as reduction in heat resistance of PTFE or coloring of PTFE after firing may not occur.

The reactive emulsifier (4) has a functional group reactive in radical polymerization and a hydrophilic group.

Examples of the hydrophilic group in the reactive emulsifier (4) include —$NH_2$, —$PO_3M$, —$OPO_3M$, —$SO_3M$, —$OSO_3M$, —COOM (in each formula, M represents H, $NH_4$ or an alkali metal). Among the above hydrophilic groups, preferred are —$SO_3M$ and —COOM. Examples of the alkali metal include Na and K.

Examples of the "functional group reactive in radical polymerization" in the reactive emulsifier (4) include a group having an unsaturated group, such as a vinyl group and an allyl group.

Since the reactive emulsifier (4) has a functional group reactive in radical polymerization, when used in the polymerization, the reactive emulsifier (4) reacts with fluorine-containing monomers at the initial stage of the polymerization and forms highly stable particles having a hydrophilic group derived from the reactive emulsifier (4). Therefore, it is presumed that the number of emulsified particles is increased when polymerization is performed in the presence of the reactive emulsifier (4).

In the polymerization, one kind of the reactive emulsifier (4) or two or more kinds of the reactive emulsifiers (4) may be present.

In the polymerization, a compound having an unsaturated bond may be used as the reactive emulsifier (4).

The reactive emulsifier (4) is preferably at least one selected from the group consisting of compounds represented by the formulae (4a) to (4e):

  (4a)

wherein n1 represents an integer of 1 to 10, $Y^3$ represents —$SO_3M^1$ or —$COOM^1$, $M^1$ represents H, $NH_4$, or an alkali metal;

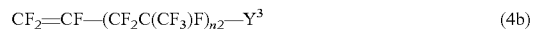  (4b)

wherein n2 represents an integer of 1 to 5, and $Y^3$ is as defined above;

  (4c)

wherein $X^1$ represents F or $CF_3$, n3 represents an integer of 1 to 10, $Y^3$ is as defined above;

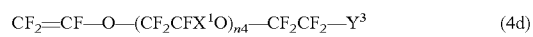  (4d)

wherein n4 represents an integer of 1 to 10, and $Y^3$ and $X^1$ are as defined above; and

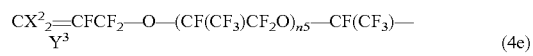  (4e)

wherein $X^2$s are the same as one another and represent F or H, n5 represents an integer of 0 or 1 to 10, and $Y^3$ is as defined above.

Examples of the alkali metal include Na and K.

In the formula (4a), the n1 is preferably an integer of 5 or less, and more preferably an integer of 2 or less. The $Y^3$ is preferably —$COOM^1$ because appropriate water-solubility and surface activity are achieved. The $M^1$ is preferably H or $NH_4$ because such $M^1$ is less likely to be left as impurities and the resulting product has better heat resistance.

Examples of the perfluoro vinyl alkyl compound represented by the formula (4a) include $CF_2$=$CFCF_2COOM^1$ (wherein $M^1$ is as defined above).

In the formula (4b), the n2 is preferably an integer of 3 or less in terms of emulsifying capacity. The $Y^3$ is preferably —$COOM^1$ because appropriate water-solubility and surface activity are achieved. The $M^1$ is preferably H or $NH_4$ because such $M^1$ is less likely to be left as impurities and the resulting product has better heat resistance.

In the formula (4c), the n3 is preferably an integer of 5 or less in terms of water-solubility. The $Y^3$ is preferably —$COOM^1$ because appropriate water-solubility and surface activity are achieved. The $M^1$ is preferably H or $NH_4$ because the dispersion stability is improved.

In the formula (4d), the $X^1$ is preferably —$CF_3$ in terms of surface activity. The n4 is preferably an integer of 5 or less in terms of water-solubility. The $Y^3$ is preferably —$COOM^1$ because appropriate water-solubility and surface activity are achieved. The $M^1$ is preferably H or $NH_4$.

Examples of the perfluoro vinyl ether compound represented by the formula (4d) include $CF_2$=$CFOCF_2CF(CF_3)OCF_2CF_2COOM^1$ (wherein $M^1$ represents H, $NH_4$ or an alkali metal).

In the formula (4e), the n5 is preferably an integer of 0 or 1 to 5, more preferably 0, 1, or 2, and still more preferably 0 or 1, in terms of emulsifying capacity. The $Y^3$ is preferably —$COOM^1$ because appropriate water-solubility and surface activity are achieved. The $M^1$ is preferably H or $NH_4$ because such $M^1$ is less likely to be left as impurities and the resulting product has better heat resistance.

Examples of the perfluoro vinyl alkyl compound represented by the formula (4e) include $CH_2$=$CFCF_2OCF(CF_3)CF_2OCF(CF_3)COOM^1$ (wherein $M^1$ is as defined above).

The method of the present invention allows preparation of an aqueous dispersion having a PTFE-particle content of 5 to 60% by mass. The aqueous dispersion may be subjected to a post-treatment for appropriate adjustment of the PTFE-particle content. The post-treatment may be performed by a conventionally known method such as dilution or purification.

The PTFE-particle content herein refers to a ratio (in percentage) of the mass of nonvolatile content of the aqueous dispersion (1 g) dried in a fan dryer at 150° C. for 30 minutes, to the mass (1 g) of the aqueous dispersion.

The PTFE particles have an average primary particle size of 50 to 500 nm, and preferably 100 to 400 nm. A more preferred lower limit of the average primary particle size is 150 nm, and a more preferred upper limit thereof is 350 nm. Having an average primary particle size within the above range, the PTFE particles can be fine powder having a low paste-extrusion pressure and excellent processability.

The average particle size is determined indirectly from the transmittance of incident light at 550 nm per unit length through a PTFE aqueous dispersion that is adjusted to have a solid content concentration of 0.22% by mass, based on a calibration curve showing a relation between the transmittance and the average primary particle size determined using a transmission electron microscope (TEM) photo.

The PTFE particles have a standard specific gravity (SSG) of 2.12 to 2.30. A preferred lower limit of the SSG is 2.13 and a preferred upper limit thereof is 2.25. Having a SSG within the above range, the PTFE particles can be formed into a product with high breaking strength. In addition, the PTFE particles can produce a porous film excellent in stretchability, and is excellent in heat resistance that is shown by the stress relaxation time.

The SSG is measured in conformity with ASTM D 4895-89.

Since having a large average primary particle size as mentioned above, the PTFE particles can be processed into fine powder having a low extrusion pressure. In addition, a product formed from the fine powder has high breaking strength due to a low SSG of the PTFE particles.

The PTFE aqueous dispersion produced by the method of the present invention can be prepared as a PTFE aqueous dispersion free from a fluorine-containing surfactant and having a high solid content concentration by a method including the steps of: (I) contacting the PTFE aqueous dispersion with an anion exchange resin in the presence of a nonionic surfactant; and (II) concentrating the aqueous dispersion resulting from the step (I) in such a manner that the solid content concentration of the aqueous dispersion is set to 30 to 70% by mass based on 100% by mass of the aqueous dispersion.

The step of contacting the PTFE aqueous dispersion with an anion exchange resin can be performed by a conventionally known method. The concentration can be performed by a method described above.

The method of the present invention preferably includes a step of recovering a PTFE aqueous dispersion separated from the anion exchange resin after the step (I).

PTFE fine powder can be produced by a method including the steps of: coagulating the PTFE aqueous dispersion produced by the method of the present invention; washing the obtained PTFE coagulated particles; and drying the resulting PTFE particles.

Coagulation of the PTFE aqueous dispersion can be performed by a conventionally known method. For example, the coagulation is performed by appropriately diluting the PTFE aqueous dispersion with water and strongly stirring the mixture. The stirring in the coagulation may be performed after an electrolyte, such as ammonium carbonate, or a water-soluble organic solvent is added to the PTFE aqueous dispersion.

The PTFE coagulated particles may be washed in water, and the washing is preferably performed at a pH not lower than the pH corresponding to the pKa of a 0.1% aqueous solution of the perfluoro carboxylic acid or its salt. The pH corresponding to the pKa in the present invention is a pH at the point of 50% neutralization of a 0.1% aqueous solution of perfluoro carboxylic acid or its salt. The washing is performed at a pH of preferably 3 or more, and more preferably 5 or more.

The washing performed at a pH within the above range allows efficient removal of perfluoro carboxylic acid or its salt used in polymerization from PTFE coagulated particles.

The PTFE coagulated particles are dried commonly at a temperature of not lower than the sublimation point of the perfluoro carboxylic acid or its salt, preferably at a temperature of 30° C. to the melting point of PTFE, more preferably at 100 to 300° C., and still more preferably at 100 to 250° C.

Since being formed from the PTFE particles described above, the PTFE fine powder has a low extrusion pressure and can be formed into a product with high breaking strength.

The PTFE fine powder can be set to have an average particle size of 100 to 1000 μm. The average particle size is preferably 300 to 800 μm, and more preferably 400 to 700 μm. The average particle size is determined in conformity with JIS K6891.

The PTFE fine powder can be set to have an apparent density of 0.35 to 0.65 g/ml. The apparent density is preferably 0.40 to 0.55 g/ml, and more preferably 0.45 to 0.52 g/ml. The apparent density is determined in conformity with JIS K 6892.

The PTFE fine powder is suitably used as various molding materials for tubes, wire coverings, sealing members, packings, sliding members, and the like, and as additives.

The PTFE fine powder is molded, for example, by paste extrusion molding.

The paste extrusion molding may be performed by a conventionally known method, and molding conditions may be set in accordance with the desired shapes or sizes. The paste extrusion molding may be performed after addition of conventionally known additives, such as pigments or fillers, to the PTFE fine powder.

The paste extrusion molding provides products of various shapes such as tubes, sheets, and films.

The PTFE fine powder can be formed into a PTFE porous body by performing stretching after paste extrusion molding.

Stretching conditions and the elongation percentage may be appropriately set in accordance with the shape or size of the paste-extruded product.

EXAMPLES

The following description is offered to illustrate the present invention based on examples, but the scope of the present invention is not limited to these examples.

Each numerical value in examples is determined by the following methods.

Concentration of Perfluoro Carboxylic Acid or its Salt

The concentration in deionized water used in polymerization was employed.

Polymer Concentration

An amount of 1 g of an aqueous dispersion was dried in a fan dryer at 150° C. for 30 minutes, and the mass ratio of heating residues relative to the mass (1 g) of the aqueous dispersion was expressed as the polymer concentration (in percentage).

The Amount of Agglomerated Polymers

After completion of the polymerization reaction, the aqueous dispersion from which paraffin wax was preliminary removed was filtered through a SUS sieve (200 mesh). Then, agglomerates of the aqueous dispersion left on the SUS sieve, agglomerates of polymers left in the reaction vessel, and agglomerates of polymers adhered to the stirring blade and baffles were collected and dried in a fan drier at 150° C. for one hour. The resulting matters were weighed, and the weight was employed as the amount of agglomerated polymers. The emulsifier highly stabilizing particles reduces the amount of agglomerated polymers even in a region where the polymer concentration is high.

Average Primary Particle Size

The average particle size is determined indirectly from the transmittance of incident light at 550 nm per unit length through a PTFE aqueous dispersion that is adjusted to have a solid content concentration of 0.22% by mass, based on a calibration curve showing a relation between the transmittance and the average primary particle size determined using a transmission electron microscope (TEM) photo.

Standard Specific Gravity (SSG)

SSG was determined in conformity with ASTM D 4895-89.

Example 1

(1) Preparation of Aqueous Dispersion

A glass pressure-tight vessel (1-L volume) equipped with a stirring blade was charged with 530 mL of deionized water, 30 g of paraffin wax (melting point of 60° C.), and 0.825 g of ammonium perfluorohexanoate (APFH). The pressure-tight vessel was injected with nitrogen and then depressurized three times for removal of oxygen in the vessel. The atmosphere inside the vessel was further substituted with tetrafluoroethylene (TFE) monomers.

TFE monomers were further injected into the vessel at 70° C. such that the internal pressure was set to 0.8 MPa. The vessel was further charged with 20 g of a 0.05% by mass aqueous solution of ammonium persulfate (APS), and the reaction was initiated. Since the pressure inside the system was lowered along with the progress of the reaction, TFE was continuously added to maintain the internal pressure at 0.8 MPa.

Stirring was stopped when the amount of supplied TFE monomers reached 101 g. The monomers were depressurized and an aqueous dispersion of TFE homopolymers was prepared. The resulting aqueous dispersion had a polymer concentration of 14.5%, an amount of agglomerated polymers of 8 g, and an average primary particle size of 270 nm.

(2) Preparation of PTFE Fine Powder

The obtained aqueous dispersion was diluted with deionized water to the polymer concentration of 10%, and stirred at 20° C. for coagulation. The coagulated particles were collected and washed in 10 volumes of water twice. The resulting particles were further dried at 160° C. for 16 hours to give PTFE fine powder.

The obtained PTFE fine powder had a SSG of 2.21.

(3) Preparation of PTFE Dispersion

To 100 g of the resulting aqueous dispersion, 1.4 g of a surfactant (NOIGEN TDS-80 by DAI-ICHI KOGYO SEIYAKU CO., LTD.) was added, and they were uniformly mixed. The mixture was passed through a column filled with anion exchange resin (AMBERLITE IRA900J by Rohm and Haas Company). The resulting aqueous dispersion was maintained at 60° C., and a concentrated polymer phase resulting from phase separation was recovered. The concentrated polymer phase had a polymer concentration of 70%. Water and a surfactant were further added to the polymer phase such that the polymer concentration was set to 60% and the surfactant content was set to 6%, and the pH was adjusted to 9.8 with ammonium water. The resulting aqueous dispersion had a viscosity of 24 cps.

Example 2

An aqueous dispersion was prepared in the same manner as in Example 1, except that the amount of APFH was changed to 2.475 g and stirring was stopped when the amount of supplied TFE monomers reached 95 g. The resulting aqueous dispersion had a polymer concentration of 14.3%, an amount of agglomerated polymer of 3 g, and an average primary particle size of 258 nm. Fine powder prepared in the same manner as in Example 1 had an SSG of 2.21.

Example 3

(1) Preparation of an Aqueous Dispersion

A glass pressure-tight vessel (1-L volume) equipped with a stirring blade was charged with 545 mL of deionized water, 30 g of paraffin wax (melting point of 60° C.), 2.475 g of ammonium perfluorohexanoate, and 5.5 mg of Krytox 157 disclosed in U.S. Pat. No. 6,429,258. The pressure-tight vessel was injected with nitrogen and then depressurized three times for removal of oxygen in the vessel. The atmosphere inside the vessel was further substituted with tetrafluoroethylene (TFE) monomers.

TFE monomers were further injected into the vessel at 70° C. such that the internal pressure was set to 0.8 MPa. The vessel was further charged with 5 g of a 0.05% by mass aqueous solution of ammonium persulfate (APS), and the reaction was initiated. Since the pressure inside the system was lowered along with the progress of the reaction, TFE was continuously added to maintain the internal pressure at 0.8 MPa. When the amount of supplied TFE monomers reached 90 g, 2 mg of hydroquinone was added, and the reaction was continued.

When the amount of supplied TFE monomers reached 217 g after 15.5 hours, stirring was stopped. The monomers were depressurized and an aqueous dispersion of TFE homopolymers was prepared. The resulting aqueous dispersion had a polymer concentration of 28.1%, an amount of agglomerated polymer of 1.8 g, and an average primary particle size of 337 nm.

(2) Preparation of PTFE Fine Powder

The obtained aqueous dispersion was diluted with deionized water to the polymer concentration of 10%, and stirred at 20° C. for coagulation. The coagulated particles were collected and washed in 10 volumes of water twice. The resulting particles were further dried at 160° C. for 16 hours to give PTFE fine powder.

The resulting PTFE fine powder had a SSG of 2.158.

(3) Extrusion Molding

An amount of 100 g of PTFE having been left to stand for at least two hours at ambient temperatures, and 21.7 g of an extrusion aid that is hydrocarbon oil (ISOPAR H (registered trademark) by Exxon Mobil Corporation) were fed to a glass bottle (900-cc volume), and mixed for three minutes. The mixture was left in a thermostat bath at 25° C. for two hours. Then, the mixture was passed through an orifice (diameter of 2.5 cm, land length of 1.1 cm, introduction angle of 30°) for paste extrusion under the conditions of a reduction ratio (RR) of 100, an extrusion rate of 51 cm/min, and a temperature of 25° C., thereby giving a bead (extrusion-molded product). In the paste extrusion, the value obtained by dividing the load when the extrusion load was at equilibrium by the area of the used cylinder was employed as the value of the extrusion pressure.

The extrusion pressure was 18.3 MPa.

(4) Measurement of Breaking Strength

The bead (extrusion-molded product) formed in measurement of the paste extrusion pressure at a RR of 100 was cut to an appropriate size, and the bead piece was immobilized at each end in such a manner that the clamp distance was 51 mm. The bead piece was heated in a circulating-air oven to 300° C., and then stretched to a total elongation percentage of 2400% at a rate of 100%/sec. A stretched body a1 was uniform without rupture or voids. The breaking strength of the stretched body a1 was measured using a tensile tester (AGS-500D by Shimadzu Corporation) at a tension rate of 300 ram/min at ambient temperatures. The measured breaking strength was 29.5 N.

(5) Measurement of Stress Relaxation Time

The bead (extrusion-molded product) formed in measurement of the paste extrusion pressure at a RR of 100 was cut to an appropriate size, and the bead piece was immobilized at each end in such a manner that the clamp distance was 38 mm. The bead piece was heated in a circulating-air oven to 300° C., and then stretched to a total elongation percentage of 2400% at a rate of 1000%/sec, thereby giving a stretched body a2. The stretched body a2 was uniform without rupture or voids. The stretched body a2 (total length of 25 cm) was tightened and immobilized using a fixture. The stretched body a2 was then left in an oven at a temperature of 390° C., and the time until the stretched body a2 was ruptured was measured as the stress relaxation time. The stretched body a2 immobilized using a fixture was brought into the oven through a (covered) slot on a side portion of the oven, and therefore the temperature was not lowered during placement of the stretched body a2 in the oven. Accordingly, time was not needed for temperature recovery as mentioned in U.S. Pat. No. 4,576,869.

The stress relaxation time was 565 seconds.

Example 4

(1) Preparation of an Aqueous Dispersion

A glass pressure-tight vessel (1-L volume) equipped with a stirring blade was charged with 545 mL of deionized water, 30 g of paraffin wax (melting point of 60° C.), 2.475 g of ammonium perfluorohexanoate, and 1 mg of Puronon 104 (nonionic surfactant by NOF Corporation). The pressure-tight vessel was injected with nitrogen and depressurized three times for removal of oxygen in the vessel. The atmosphere inside the vessel was further substituted with tetrafluoroethylene (TFE) monomers.

TFE monomers were injected into the vessel at 70° C. such that the internal pressure was set to 0.8 MPa. The vessel was further charged with 5 g of a 0.05% by mass aqueous solution of ammonium persulfate (APS), and the reaction was initiated. Since the pressure inside the system was lowered along with the progress of the reaction, TFE was continuously added to maintain the internal pressure at 0.8 MPa. When the amount of supplied TFE monomers reached 90 g, 2 mg of hydroquinone was added, and the reaction was continued.

When the amount of supplied TFE monomers reached 217 g after 11.2 hours, stirring was stopped. The monomers were depressurized and an aqueous dispersion of TFE homopolymers was prepared. The resulting aqueous dispersion had a polymer concentration of 28.0%, an amount of agglomerated polymers of 2.9 g, and an average primary particle size of 306 nm.

(2) Preparation of PTFE Fine Powder

The obtained aqueous dispersion was diluted with deionized water to the polymer concentration of 10%, and stirred at 20° C. for coagulation. The coagulated particles were collected and washed in 10 volumes of water twice. The resulting particles were further dried at 160° C. for 16 hours to give PTFE fine powder.

The resulting PTFE fine powder had a SSG of 2.165.

(3) Extrusion Molding

Extrusion molding was performed in the same manner as in Example 3. The extrusion pressure was 15.4 MPa.

(4) Measurement of Breaking Strength

The breaking strength was measured in the same manner as in Example 3. The measured breaking strength was 22.6 N.

(5) Measurement of Stress Relaxation Time

The stress relaxation time was measured in the same manner as in Example 3.

The measured stress relaxation time was 315 seconds.

Example 5

(1) Preparation of Aqueous Dispersion

A stainless-steel (SUS 316) autoclave (6-L volume) equipped with a stainless-steel (SUS 316) anchor-type stirring blade and a jacket for temperature control was charged with 3560 mL of deionized water, 104 g of paraffin wax (melting point of 60° C.), and 16.11 g of ammonium perfluorohexanoate (APFH), and 161 mg of Krytox 157 mentioned in U.S. Pat. No. 6,429,258. The vessel was purged with nitrogen gas three times and with TFE gas twice while heated to 70° C. for removal of oxygen. Then, the TFE gas was introduced to adjust the internal pressure to 0.70

MPa, and the system was stirred at 280 rpm, while the internal temperature was maintained at 70° C.

After the temperature inside the polymerization vessel was stabilized, an aqueous solution containing 13 mg of ammonium persulfate (APS) dissolved in 20 g of deionized water was added under TFE pressure to adjust the internal pressure of the autoclave to 0.78 MPa. The reaction was acceleratively progressed, and the reaction temperature was maintained at 70° C. and the stirring was performed at 280 rpm. Further, TFE was continuously added so that the internal pressure of the autoclave was always kept at 0.78 MPa.

When the amount of the supplied TFE monomers reached 540 g, an aqueous solution containing 13 mg of hydroquinone dissolved in 20 g of deionized water was further added under TFE pressure, and the reaction was continued.

When the amount of the supplied TFE reached 1350 g, stirring was stopped. The monomers were depressurized and a TFE aqueous dispersion was prepared. The obtained aqueous dispersion had a polymer concentration of 27.2%, an amount of agglomerated polymer of 10 g, and an average primary particle size of 292 nm.

(2) Preparation of PTFE Fine Powder

The obtained aqueous dispersion was diluted with deionized water to the polymer concentration of 13%, and stirred at 20° C. for coagulation. The coagulated particles were collected and washed in 10 volumes of water twice. The resulting particles were further dried at 210° C. for 16 hours to give PTFE fine powder. The resulting PTFE fine powder had a SSG of 2.157.

Extrusion molding was performed in the same manner as in Example 3. The extrusion pressure was 18.8 MPa.

The breaking strength was measured in the same manner as in Example 3. The measured breaking strength was 29.6 N.

The stress relaxation time was measured in the same manner as in Example 3. The measured stress relaxation time was 676 seconds.

Example 6

An aqueous dispersion was prepared in the same manner as in Example 5, except that Krytox 157 was not used and 0.08 g (0.006% by mass based on the net amount of produced PTFE) of perfluorobutylethylene ($CH_2$=CH—$C_4F_9$) was used as comonomers instead. The resulting aqueous dispersion had a polymer concentration of 27.3%, an amount of agglomerated polymers of 2 g, and an average primary particle size of 251 nm. Fine powder prepared in the same manner as in Example 1 had a SSG of 2.144.

Extrusion molding was performed in the same manner as in Example 3. The extrusion pressure was 18.8 MPa.

The breaking strength was measured in the same manner as in Example 3. The measured breaking strength was 32.3 N.

The stress relaxation time was measured in the same manner as in Example 3. The measured stress relaxation time was 515 seconds.

Example 7

An aqueous dispersion was prepared in the same manner as in Example 5, except that Krytox 157 was not used and 0.12 g (0.009% by mass based on the net amount of produced PTFE) of perfluoromethyl vinyl ether ($CF_2$=CF—O—$CF_3$) was used as comonomers instead, and the coagulated particles were dried at 160° C. The resulting aqueous dispersion had a polymer concentration of 27.3%, an amount of agglomerated polymers of 2 g, and an average primary particle size of 273 nm. Fine powder prepared in the same manner as in Example 1 had a SSG of 2.151.

Extrusion molding was performed in the same manner as in Example 3. The extrusion pressure was 16.2 MPa.

The breaking strength was measured in the same manner as in Example 3. The measured breaking strength was 30.8 N.

The stress relaxation time was measured in the same manner as in Example 3. The measured stress relaxation time was 505 seconds.

Example 8

An aqueous dispersion was prepared in the same manner as in Example 2, except that 11 mg of a 50% aqueous solution of an reactive emulsifier that is $CH_2$=CF$CF_2$OCF($CF_3$)$CF_2$OCF($CF_3$)COONH$_4$ (reactive emulsifier A) was fed to the system together with APFH. The resulting aqueous dispersion had a polymer concentration of 14.6%, an amount of agglomerated polymers of 0.9 g, and an average primary particle size of 209 nm. Fine powder prepared in the same manner as in Example 1 had a SSG of 2.21.

Example 9

An aqueous dispersion was prepared in the same manner as in Example 5, except that Krytox 157 was not used and 72 mg of a 50% aqueous solution of the reactive emulsifier A was fed to the system together with APFH. The resulting aqueous dispersion had a polymer concentration of 27.3%, an amount of agglomerated polymers of 2 g, and an average primary particle size of 285 nm. Fine powder prepared in the same manner as in Example 1 had a SSG of 2.157.

Extrusion molding was performed in the same manner as in Example 3. The extrusion pressure was 18.1 MPa.

The breaking strength was measured in the same manner as in Example 3. The measured breaking strength was 32.1 N.

The stress relaxation time was measured in the same manner as in Example 3. The measured stress relaxation time was 560 seconds.

The invention claimed is:

1. A method for producing an aqueous dispersion containing non-melt-processable polytetrafluoroethylene particles, the method comprising
polymerizing tetrafluoroethylene in an aqueous medium in the presence of perfluoro hexanoic acid or its salt,
wherein tetrafluoroethylene is polymerized further in the presence of a nonionic surfactant (2),
wherein the nonionic surfactant (2) is a fluorine-free nonionic surfactant.

2. A method for producing an aqueous dispersion containing non-melt-processable polytetrafluoroethylene particles, the method comprising
polymerizing tetrafluoroethylene in an aqueous medium in the presence of perfluoro hexanoic acid or its salt,
wherein tetrafluoroethylene is polymerized further in the presence of fluoropolyether acid having a molecular weight of at least 800 g/mol or its salt (1), and
wherein the amount of the fluoropolyether acid or its salt (1) is 10 to 100 ppm based on the amount of the aqueous medium.

3. The method according to claim 2,
wherein the fluoropolyether acid or its salt (1) has at least one repeated structure selected from the group consisting of repeated structures represented by the formulae (1a) to (1d):

$$(-CFCF_3-CF_2-O-)_n \quad (1a);$$

$$(-CF_2-CF_2-CF_2-O-)_n \quad (1b);$$

$$(-CF_2-CF_2-O-)_n-(-CF_2-O-)_m \quad (1c); \text{ and}$$

$$(-CF_2-CFCF_3-O-)_n-(-CF_2-O-)_m \quad (1d),$$

wherein m and n each represent an integer of 1 or more.

4. The method according to claim 2,
wherein the fluoropolyether acid or its salt (1) is a carboxylic acid or its salt, and has repeated structures represented by the formulae (1a):

$$(-CFCF_3-CF_2-O-)_n \quad (1a);$$

wherein n represent an integer of 1 or more.

5. A method for producing an aqueous dispersion containing non-melt-processable polytetrafluoroethylene particles, the method comprising
polymerizing tetrafluoroethylene in an aqueous medium in the presence of perfluoro hexanoic acid or its salt,
wherein tetrafluoroethylene is polymerized further in the presence of a comonomer (3) having a monomer reactivity ratio of 0.1 to 8,
the amount of the comonomer (3) is 0.001 to 0.01% by mass based on the net amount of the produced polytetrafluoroethylene.

6. The method according to claim 5,
wherein the comonomer (3) is at least one selected from the group consisting of comonomers represented by the formulae (3a) to (3d):

$$CH_2=CH-Rf^1 \quad (3a),$$

wherein $Rf^1$ represents a C1-C10 perfluoroalkyl group;

$$CF_2=CF-O-Rf^2 \quad (3b),$$

wherein $Rf^2$ represents a C1-C2 perfluoroalkyl group;

$$CF_2=CF-O-(CF_2)_nCF=CF_2 \quad (3c),$$

wherein n represents 1 or 2;

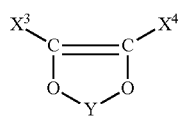
(3d)

wherein $X^3$ and $X^4$ each represent F, Cl, or a methoxy group, and Y is represented by the formula Y1 or Y2; and $$-CF=CF- \quad (Y1)$$

(Y2)

wherein Z and Z' each represent F or a C1-C3 fluorinated alkyl group.

7. A method for producing an aqueous dispersion containing non-melt-processable polytetrafluoroethylene particles, the method comprising
polymerizing tetrafluoroethylene in an aqueous medium in the presence of perfluoro hexanoic acid or its salt,
wherein tetrafluoroethylene is polymerized further in the presence of a reactive emulsifier (4),
wherein the reactive emulsifier (4) is at least one selected from the group consisting of compounds represented by the formulae (4a) to (4e):

$$CF_2=CF-(CF_2)_{n1}-Y^3 \quad (4a),$$

wherein n1 represents an integer of 1 to 10, $Y^3$ represents $-SO_3M^1$ or $-COOM^1$, $M^1$ represents H, $NH_4$, or an alkali metal;

$$CF_2=CF-(CF_2C(CF_3)F)_{n2}-Y^3 \quad (4b),$$

wherein n2 represents an integer of 1 to 5, and $Y^3$ is as defined above;

$$CF_2=CF-O-(CFX^1)_{n3}-Y^3 \quad (4c),$$

wherein $X^1$ represents F or $CF_3$, n3 represents an integer of 1 to 10, and $Y^3$ is as defined above;

$$CF_2=CF-O-(CF_2CFX^1O)_{n4}-CF_2CF_2-Y^4 \quad (4d),$$

wherein n4 represents an integer of 1 to 10, $Y^4$ represents $-SO_3M^2$ or $-COOM^2$, $M^2$ represents $NH_4$ or an alkali metal, and $X^1$ is as defined above; and $$CX^2{}_2=CFCF_2-O-(CF(CF_3)CF_2O)_{n5}-CF(CF_3)-Y^3 \quad (4e),$$

wherein $X^2$s are the same as one another and represent F or H, n5 represents an integer of 0 or 1 to 10, and $Y^3$ is as defined above.

* * * * *